Figure 11:
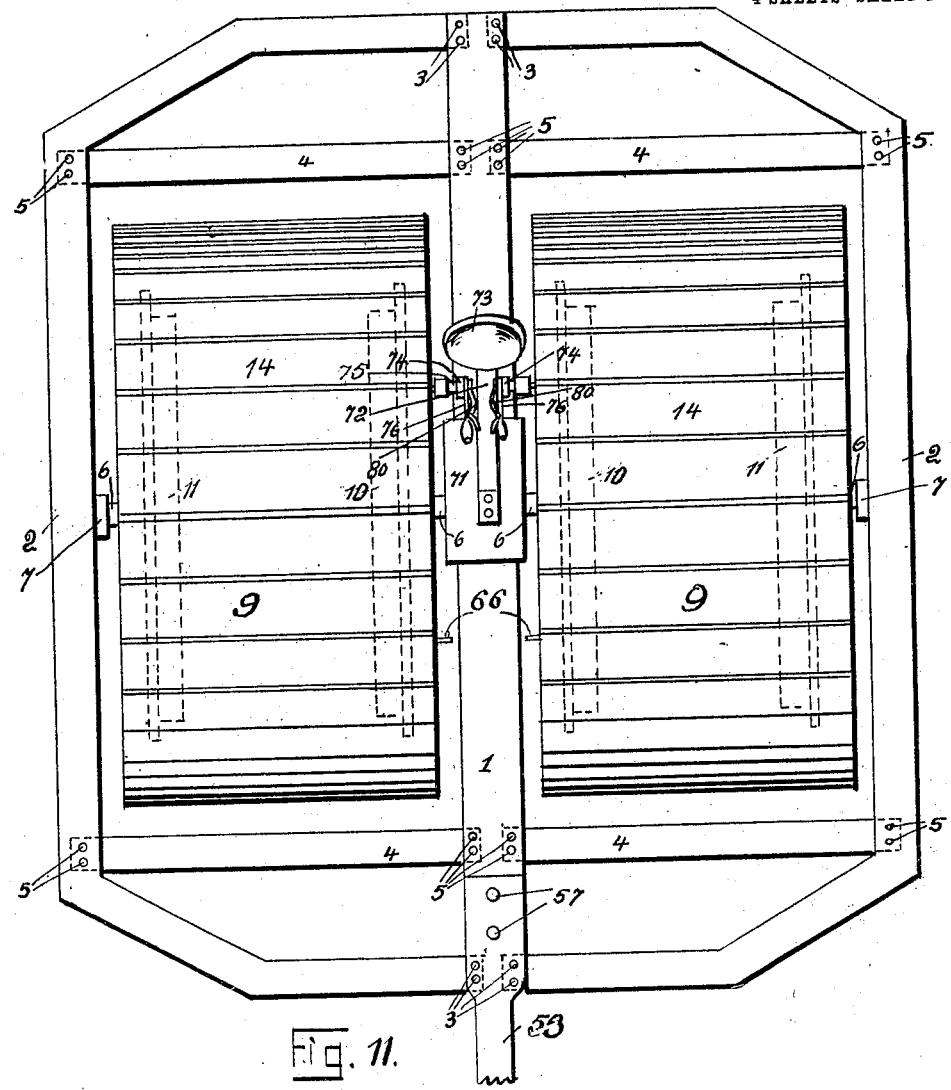

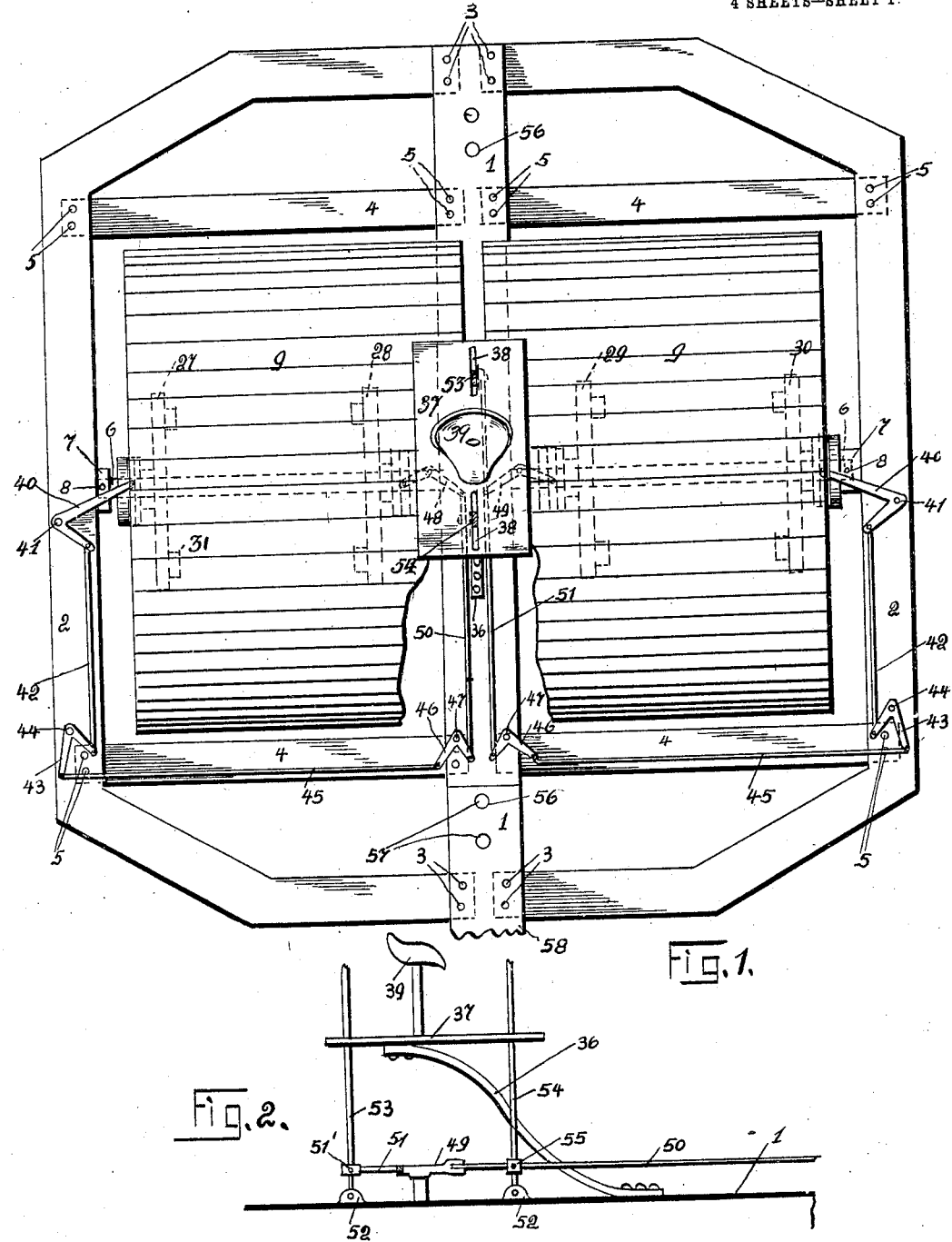

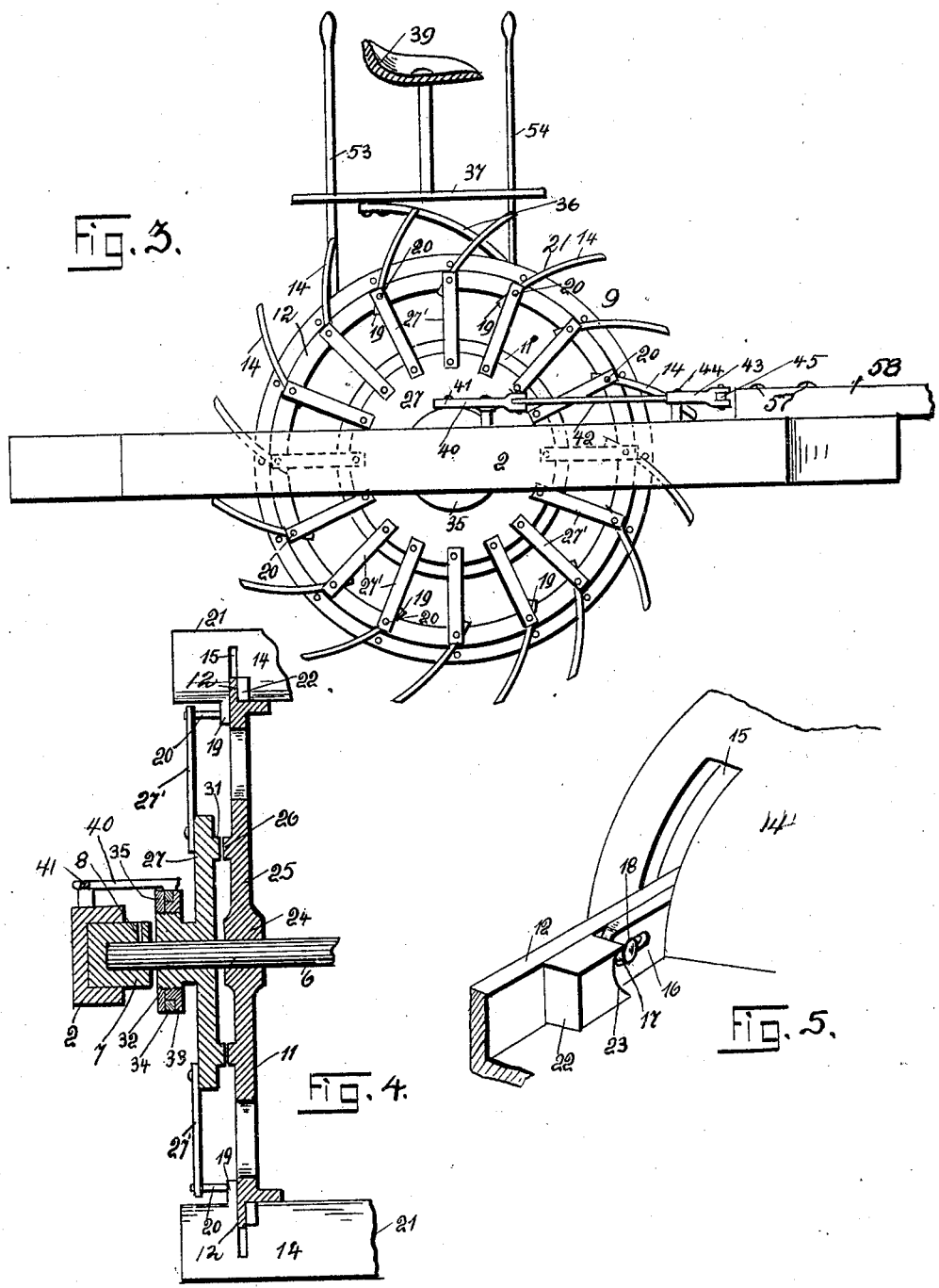

No. 836,582. PATENTED NOV. 20, 1906.
A. R. JEFFREY.
AGRICULTURAL IMPLEMENT.
APPLICATION FILED NOV. 5, 1904.
4 SHEETS—SHEET 3.
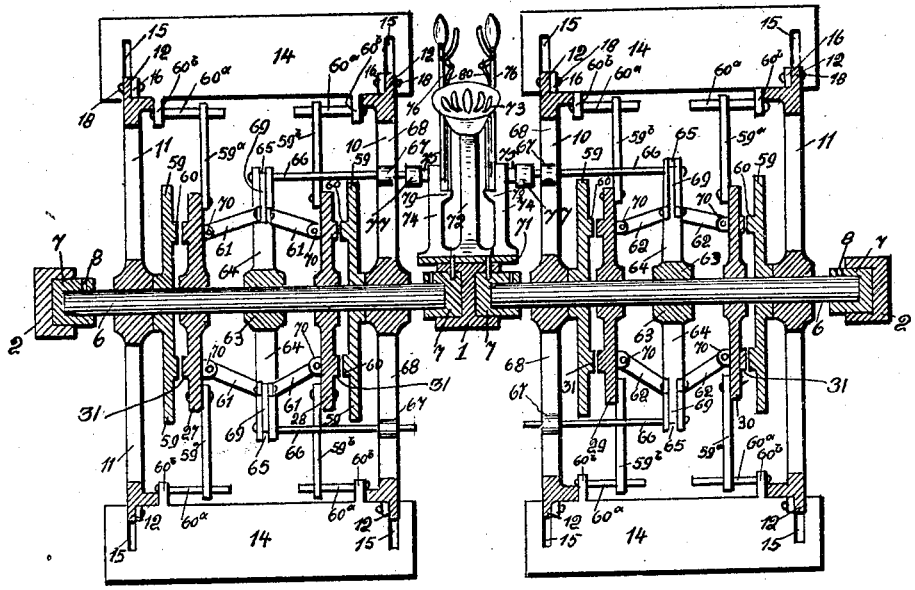
Fig. 6.
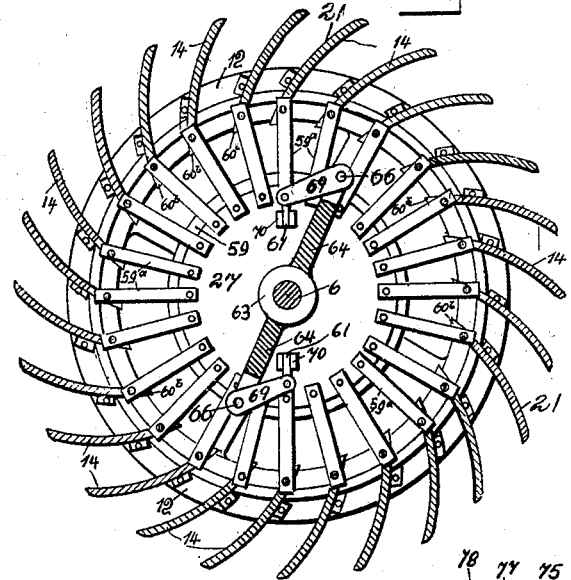
Fig. 7.
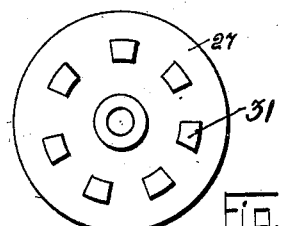
Fig. 8.
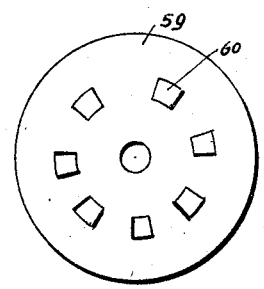
Fig. 9.
Fig. 10.
Witnesses:
Inventor.
Andrew R. Jeffrey
by
Attorneys.

No. 836,582. PATENTED NOV. 20, 1906.
A. R. JEFFREY.
AGRICULTURAL IMPLEMENT.
APPLICATION FILED NOV. 5, 1904.

4 SHEETS—SHEET 4.

Witnesses:
Inventor.
Andrew R. Jeffrey.
by
Attorneys.

UNITED STATES PATENT OFFICE.

ANDREW R. JEFFREY, OF WASHINGTON, PENNSYLVANIA.

AGRICULTURAL IMPLEMENT.

No. 836,582.  Specification of Letters Patent.  Patented Nov. 20, 1906.

Application filed November 5, 1904. Serial No. 231,531.

*To all whom it may concern:*

Be it known that I, ANDREW R. JEFFREY, a citizen of the United States of America, residing at Washington, in the county of Washington and State of Pennsylvania, have invented certain new and useful Improvements in Agricultural Implements, of which the following is a specification, reference being had therein to the accompanying drawings.

This invention relates to certain new and useful improvements in agricultural implements, and relates more particularly to a combined harrow and roller.

The object of this invention is to provide an implement of this type which may be employed as a harrow and then quickly changed to a roller.

In constructing my improved implement I have employed a plurality of pivoted blades which are mounted in wheels rotatably mounted within a suitable frame, and I have provided mechanism in connection with each wheel whereby the blades may be easily and quickly locked in any position in which it is desired to operate the same, the blades being so constructed that they may be closed one upon the other and the implement used as a roller or clod-breaker.

The above construction, together with the details entering into this invention, will be hereinafter more fully described and then specifically pointed out in the claims, and, referring to the drawings accompanying this application, like numerals of reference designate corresponding parts throughout the several views, in which—

Figure 12:
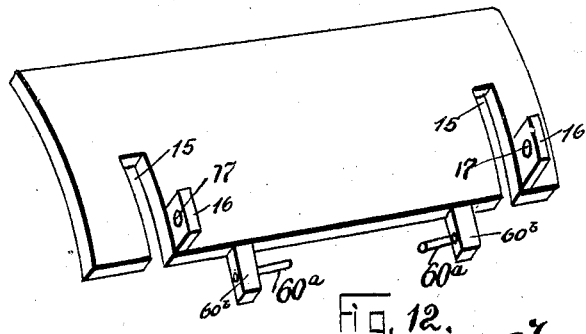

Figure 1 is a top plan view of my improved implement as preferably constructed, a portion of the wheels thereof being broken away. Fig. 2 is a detail side elevation view of the seat and operating-levers of my improved implement. Fig. 3 is a side elevation of the implement, showing the seat thereof in section. Fig. 4 is a vertical sectional view of one of the side frames and a portion of one of the wheels of my improved implement. Fig. 5 is a detail perspective view illustrating the pivotal connection of the blades of the wheels of my improved implement. Fig. 6 is a vertical sectional view of my improved implement, showing a modified form of construction. Fig. 7 is a vertical sectional view of one of the wheels of the implement as illustrated in Fig. 6 of the drawings. Fig. 8 is a side elevation of one of the loosely-mounted wheels of my improved implement. Fig. 9 is a similar view of one of the wheels employed in connection with the modified form of construction of my improved implement. Fig. 10 is a detail sectional view of a portion of the implement illustrated in Figs. 6 and 7 of the drawings. Fig. 11 is a top plan view of my improved implement as constructed in accordance with the modified form, and Fig. 12 is a detail perspective view of one of the blades employed in connection with the implement illustrated in Fig. 6 of the drawings.

To put my invention into practice, I intend to construct a substantially rectangular frame of I-bars and channel-bars, and reference will first be had to Fig. 1 of the drawings, wherein I have illustrated a top plan view of my improved implement. It will be seen from this view that the frame is of a substantially rectangular shape and is constructed with tapering ends. The center beam 1 of my improved implement is preferably constructed of an I-bar, while the frames are constructed of channel-bars 2 2. The ends of the channel-bars are secured to the ends of the center beam by rivets 3 3, and to brace the channel-bars I have employed the transverse channel-beams 4 4 at each end of the frame, and these beams are secured to the center beam and the channel-bars 2 2 by rivets 5 5. Between the center beam 1 and the channel-bars 2 are mounted the axles 6 6, which are journaled in the boxes 7 7, carried by the flanges of the center beam and the channel-bars. These boxes are of the ordinary construction and are provided with oiling-ports 8. Upon each of the axles 6 is mounted a wheel, which in its entirety is designated by the reference-numeral 9. As each wheel is somewhat similar in construction, like numerals of reference will designate some of the like parts, while distinct numerals will be employed for designating special constructions employed upon each wheel. In Figs. 6 to 7 and 9 to 12, inclusive, I have illustrated a modified form of construction, the modification residing in the position of the levers and locking-wheels which are employed in connection with my improved implement, and the main features of construction may be seen by referring to these figures in connection with the preferred form of construction as illustrated in Figs. 1 to 5, inclusive.

Each of the wheels 9 of my improved implement is constructed of two concentric wheels, the reference-numerals 10 designating the innermost wheel of each of the wheels 9, while the reference-numeral 11 designates the outer wheels. These wheels have their peripheries flanged, as indicated by the reference-numerals 12, and to these peripheral flanges are pivoted a plurality of blades 14. A portion of one of these blades is illustrated in Fig. 5 of the drawings, and each blade is provided with slots 15 15, formed in its one edge, a portion of the material cut away by each slot being bent outwardly to form lugs 16 16, which are provided with slots 17, whereby the blades may be pivoted to the peripheral flanges by pins 18 18. The edges of each blade adjacent to the lugs 16 16 are provided with depending arms 19 19, each arm being provided with an outwardly-extending pin 20. The opposite edge of each blade is slightly curved, as designated at 21, and the blades are so mounted that when they are closed they will overlap one another, as will be hereinafter more fully described. The peripheral flanges 12 are provided with integral blocks 22, these blocks being formed directly in the rear of the pivotal connection of the blades 14 with the peripheral flange 12, and each block is formed with a curved surface 23. The hub portion 24 of each of the wheels 10 and 11 is provided with an annular web portion 25, the outer face of each web portion being provided with the circularly-arranged teeth 26. Mounted upon the axles 6 6 are the wheels 27, 28, 29, and 30, which are all slidably mounted upon the axles. The wheels are identical in construction and are provided upon their one face with circularly-arranged teeth 31. The opposite faces of these wheels are connected by links 27' to the pins 20 of each of the blades 14, said links being pivotally connected to the wheels 27 to 30, inclusive, and pivotally mounted upon the pins 20. The hub portion of each wheel is threaded, as indicated at 32, and upon each threaded hub is secured a flanged collar 33, upon which a ring 34 is rotatably mounted, and this ring is retained upon the collar by a nut 35, secured upon the threaded end of the hub. Each of the wheels 27, 28, 29, and 30 is mounted upon the axles, whereby the teeth 31 will face the teeth 26 of each of the wheels 10 10 and 11 11.

Mounted upon the center beam 1 of my improved implement is an upwardly-extending spring-bar 36, which extends above the blades 14 and is provided with a foot-plate 37, having slots 38 38 formed therein. Upon this foot-plate is mounted a rotatable seat 39, upon which the operator of the implement may sit when driving a team attached to my improved implement. To the rings 34 of the wheels 27 and 30 are pivoted the arms 40 of the bell-cranks, which are pivotally mounted upon the frames 2 2, as indicated at 41 41, and these bell-cranks are connected by links 42 42 to the bell-cranks 43 43, which are pivotally connected to the frames 2, as indicated at 44 44. The bell-cranks 43 are in turn connected by links 45 45 to the bell-cranks 46 46, pivoted, as indicated at 47, to the center beam 1. The rings 34 of the wheels 28 and 29 are pivotally connected to the pivoted bell-cranks 48 and 49, and these bell-cranks are connected by links 50 and 51 to the bell-cranks 46 46. The center beam of the implement is provided with the lugs 52 52, in each of which are pivotally mounted levers 53 and 54, and to the lever 54 is connected, as indicated at 55, the link 50, while the lever 53 is connected to the link 51, as indicated at 51'. The levers 53 and 54 extend upwardly through the slots 38 38 of the foot-plate 37, and when the operator of the implement is sitting upon the seat 39 one of the levers will be in the rear of the seat while the other of said levers will be in front of the operator, and each lever may be easily operated to manipulate the blades, as will be presently described. The reference-numerals 56 56 designate openings formed in each end of the center beam 1, and in these openings pins 57 may be placed to secure the tongue 58 of the implement to the frame, and should it be desired to reverse the implement the tongue is removed to the opposite side of the implement and secured, by means of the pins 57, in the openings formed in this end of the center beam.

Operation: I will assume that the implement is being used as a harrow and that the blades 14 are in a position similar to that illustrated in Fig. 3 of the drawings. Should the soil over which the implement is to pass be of a finer nature than that which has just been harrowed, the blades are further inclined, whereby the soil will not be agitated or tilled to that extent as when the blades are at a more obtuse angle with relation to the wheels 9, and to change the inclination of the blades the levers 53 and 54 are moved to place the wheels 27, 28, 29, and 30 in the position illustrated in Fig. 4 of the drawings. This is accomplished through the medium of the links and bell-cranks heretofore described, and when the wheels 27 to 30, inclusive, are out of engagement with the wheels 10 10 and 11 11 the team is moved forward until the blades have by the rotation of wheels 10 and 11 been inclined to the desired angle or inclination, at which time the levers 53 and 54 are manipulated to place the wheels 27 to 30, inclusive, in engagement with the wheels 10 10 and 11 11. The teeth 26 of these wheels will interlock with the teeth 31 of the wheels 27 to 30, inclusive, and when the team is again moved forward the wheels 27 to 30, inclusive, will be rotated simultaneously with the wheels 10 and 11, the rings 34 of each wheel permitting these wheels to rotate without interfering with the pivotal connection of the bell-cranks 40, 48, and 49 with said wheels. The same operation is performed should it be desired to raise the blades by backing the team connected to the implement, and when it is desired to operate the implement in a reverse direction the tongue 58 is carried to the opposite end of the implement and the seat 39 reversed. Should the blades 14 encounter any rock or hard substance, which would have a tendency to disconnect the same from the wheels 10 10 and 11 11, I have provided a construction illustrated in Fig. 5. Should the blades strike a rock, they will be moved rearwardly until the lugs 16 engage the blocks 22 and the strain of the pressure against said blades will be relieved from the pivotal connection thereof.

The construction illustrated in Figs. 6 to 12, inclusive, shows a modified form of construction which may be employed for operating and adjusting the inclination of the blades 14 of my improved implement. By referring to these views it will be observed that the bell-cranks and links are removed from the frame of the implement and that the arrangement of the wheels 27 to 30, inclusive, is somewhat different from that illustrated in the preferred form of construction. In this modified form of construction I employ wheels 59 59 in each of the wheels 9 9, these wheels 59 being provided with teeth 60, which correspond to the teeth 26 of the wheels 10 10 and 11 11. The wheels 27 to 30, inclusive, are mounted between the wheels 59 59, and the inner faces of these wheels are connected by pivoted links 59$^a$ and 59$^b$ to pins 60$^a$ 60$^a$, carried by the depending lugs 60$^b$ of the blades 14. The lugs 60$^b$ are formed so that they will be positioned within the wheels 10 and 11, and the links 59$^a$ and 59$^b$ are similar to the links 27′ 27′, heretofore described. The wheels 27 and 28 are connected together by toggle-levers 61, while the wheels 29 and 30 are connected together by toggle-levers 62 62. Referring to Fig. 6 of the drawings, it will be seen that each of the wheels 9 is identical in construction. Therefore I deem it only necessary to describe one of these wheels as constructed in accordance with the modified form. Centrally mounted upon the axle 6, between the wheels 27 and 28, is a hub 63, which is provided with the diametrically opposite disposed radial posts 64 64, the outer edns of each post being bifurcated, as designated at 65, and in these bifurcated ends are rotatably mounted the shafts 66 66, which are also supported in the lugs 67, carried by the spokes 68 of the wheels 10 and 11. Mounted in the bifurcated ends of the posts 64 64 and upon the shafts 66 66 are the crank-arms 69, to the outer ends of which are pivotally connected the toggle-levers 61, each of said toggle-levers being pivotally connected to the lugs 70 of the wheels 27 to 30, inclusive. In the modified form of constructing my improved implement the wheels 9 9 are a greater distance apart, owing to the arrangement of the levers upon the center beam 1, which are necessary to operate the wheels 27 to 30, inclusive, to adjust the blades 14. Upon the center beam 1, directly above the axle 6, is secured a foot-plate 71, which is somewhat similar in construction to the foot-plate 37, and upon this foot-plate is mounted a curved standard 72, carrying a rotatable seat 73. Upon each side of the standard 72 is mounted a standard 74, in the top of which is journaled a stub-shaft 75, which upon its one end carries an upwardly-extending lever 76, while to the other end of said stub-shaft is secured a collar 77, that is adapted to receive the ends of the shaft 66, said shaft being secured therein by a set-screw 78 or any other desired means. The standard 74 is provided with a segment-toothed rack 79, with which engages the locking-lever 80, carried by the lever 76. The levers 76 are manipulated similar to the levers 53 and 54, and while I have not shown any locking means for the last-named levers it is obvious that the segment-toothed rack 79 and the locking-lever 80 may be employed in connection with the levers 53 and 54. It being desired to change the inclination of the blades, the implement is moved until one of the shafts 66 is in position to be engaged by the collar 77, carried upon the stub-shaft 75, this position being shown in Fig. 6 of the drawings, and when one of the shafts 66 is in engagement with the lever 76 the lever is moved until the wheels 27 and 28 have been removed from engagement with the wheels 59, this being accomplished through the medium of the toggle-levers 61. The lever 76 is then disengaged from the shaft 66, and the team is moved sufficiently to incline the blades at a different position to that which they occupied previously to the above-described operation having been performed. When the blades have been set, the lever 76 is again connected to one of the shafts 66 and the wheels 23 and 24 are placed in engagement with the wheels 59, whereby they will rotate in unison.

From the foregoing description it will be observed that I have illustrated two different constructions which may be embodied in my improved implement, and it is obvious that the number of blades used in connection with the implement may be varied and other mechanism than that shown employed for governing the inclination of the blades, and various changes may be made in the details of construction without departing from the general spirit and scope of the invention.

Having fully described my invention, what I claim, and desire to secure by Letters Patent, is—

1. An implement of the type described, comprising a frame, revoluble wheels mounted in said frame, a plurality of blades pivotally connected to said wheels, and means for locking said blades in a plurality of inclined positions, substantially as described.

2. In an implement of the type set forth, the combination with a frame, of two wheels mounted within said frame, a plurality of inclined blades connected to each wheel, mechanism mounted within said wheels to lock said blades at a plurality of inclined positions, and means carried by said frame to actuate said mechanism for locking the blades, substantially as described.

3. An implement of the type set forth, comprising a frame, a plurality of wheels journaled in said frame, a plurality of inclined blades carried by said wheels, and means mounted within said wheels and actuated from without said wheels to lock said blades in opened and in closed positions, substantially as described.

4. An implement of the type set forth, comprising a frame, a plurality of wheels mounted within said frame, blades pivotally connected to said wheels, and means whereby said blades may be locked at any desired inclination, substantially as described.

5. An implement of the type set forth, comprising a frame, a plurality of pivotally-mounted blades, means to support said blades, and means to lock said blades at either of two inclinations, substantially as described.

6. An implement of the type set forth, comprising a frame, axles mounted in said frame, a plurality of pivotally-mounted blades carried by each axle, means carried by each axle and actuated from said frames to lock said blades at different angles of inclination relatively to the axle and means carried by each axle to operate said locking means, substantially as described.

In testimony whereof I affix my signature in the presence of two witnesses.

ANDREW R. JEFFREY.

Witnesses:
  E. E. POTTER,
  K. H. BUTLER.